United States Patent
Borowski et al.

(10) Patent No.: US 6,909,760 B2
(45) Date of Patent: Jun. 21, 2005

(54) SYCHRONIZATION DATA DETECTION UNIT AND METHOD

(75) Inventors: Jörg Borowski, Dresden (DE); Menno Mennenga, Dresden (DE); Rüdiger Menken, Ottendorf-Okvilla (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 43 days.

(21) Appl. No.: 10/259,717

(22) Filed: Sep. 27, 2002

(65) Prior Publication Data

US 2003/0185194 A1 Oct. 2, 2003

(30) Foreign Application Priority Data

Mar. 28, 2002 (DE) .......................... 102 14 063

(51) Int. Cl.$^7$ .............................. H04L 7/00; H04B 1/69
(52) U.S. Cl. ....................................... 375/367; 375/147
(58) Field of Search ................................ 375/363–366, 375/145, 147, 149, 316, 340, 367; 370/509–514, 515

(56) References Cited

U.S. PATENT DOCUMENTS

| | | | | | |
|---|---|---|---|---|---|
| 5,235,643 | A | * | 8/1993 | Anderson et al. | 380/33 |
| 5,345,437 | A | * | 9/1994 | Ogawa | 370/228 |
| 5,973,625 | A | * | 10/1999 | Nam | 341/50 |
| 5,982,807 | A | * | 11/1999 | Snell | 375/146 |
| 6,332,010 | B1 | * | 12/2001 | Lee | 375/368 |
| 6,529,558 | B1 | * | 3/2003 | Fimoff et al. | 375/262 |

FOREIGN PATENT DOCUMENTS

| | | |
|---|---|---|
| EP | 1189360 | 3/2002 |
| FR | 2493646 | 10/1980 |
| WO | WO 03/084119 A1 * | 10/2003 |

OTHER PUBLICATIONS

"D–Netz–Technik und Meβpraxis: Netz–eigenschaften; Übertragungsverfahren, praktische Meβtechnik", Redl, Matthias Weber–München: Franzis, 1993, pp. 59–60.

Mizoguchi M, et al: "A Fast Burst Synchronization Scheme for OFDM", Universal Personal Communications 1998, ICUPC '98, IEEE 1998 International Conference on Florence, Italy Oct. 5–9, 1998, New York, NY USA IEEE, US Oct. 5, 1998, pp. 125–129.

"802.11b" Part 11: Wireless LAN Medium Access Control (MAC) and Physical Layer (PHY) Specifications: Higher–Speed Physical Layer Extension in the 2.4GHz Band, IEEE STD 802.11B–1999, 1999.

International search report application No. PCT/US03/06259 mailed Jun. 27, 2003.

International search report application No. PCT/US03/06259 mailed Jun. 23, 2004.

* cited by examiner

*Primary Examiner*—Tesfaldet Bocure
(74) *Attorney, Agent, or Firm*—Meyertons Hood Kivlin Kowert & Goetzel, P.C.; B. Noël Kivlin

(57) ABSTRACT

A synchronization data detecting unit is provided in a communication system for detecting predetermined synchronization data. The synchronization data are sent in a transmission frame in a communication signal of the communication system. The synchronization data include a sequence of identical binary symbols which are transmitted after scrambling. The synchronization detection unit comprises a descrambler for descrambling the received communication and for producing an output data sequence having multi-level signal values. The multi-level signal values of the descrambler output are smoothed in a filter unit. The smoothed signal is compared with a predetermined threshold value. If the smoothed signal exceeds the predefined threshold value, a detection of said synchronized data is indicated.

42 Claims, 5 Drawing Sheets

SYCHRONIZATION DATA DETECTION UNIT AND METHOD

BACKGROUND OF THE INVENTION

1. Field of the Invention

The invention generally relates to a synchronization data detection unit and a method for detecting predetermined synchronization data, and in particular to a receiver and a receiving method in a wireless local area network (WLAN) communication system.

2. Description of the Related Art

In a communication system such as a wireless local area network (WLAN) system, it is important for a receiver to be synchronized to the transmitter so that messages can successfully be exchanged between the transmitter and the receiver. A wireless local area network system is a flexible data communication system implemented as an extension to or an alternative for a wired LAN. WLAN systems transmit and receive data over the air using radio frequency or infrared technology to minimize the need for wired connections. Thus, WLAN systems combine data connectivity with user mobility.

Most WLAN systems use spread spectrum technology, a wide-band radio frequency technique developed for use in a reliable and secure communication system. The spread spectrum technology is designed to trade-off band-width efficiency for reliability, integrity and security. Two types of spread spectrum radio systems are frequently used: frequency hoping and direct sequence systems.

In direct sequence spread spectrum systems, spreading is achieved by encoding each data bit using a code word or symbol that has a much higher frequency and information bit rate. The resultant "spreading" of the signal across a wider frequency bandwidth results in a comparatively lower power spectrum density, so that other communication systems are less likely to suffer interference from the device that transmits the direct sequence spread spectrum signal. Direct sequence spread spectrum employs a pseudo random noise code word known to the transmitter and receiver to spread the data. The code word consists of a sequence of "chips" that are multiplied by (or exclusive-ORed) with the information bits to be transmitted. Many wireless networks conform the IEEE 802.11 standard which employs the well-known Barker code word to encode and spread the data. The Barker code word consists of a predefined sequence of eleven chips. One entire Barker code word sequence is transmitted at the time period occupied by an information-containing symbol.

To allow higher data rate transmissions, the IEEE 802.11 standard was extended to IEEE 802.11b. In addition to the 11-bit Barker chip, the 802.11b standard uses an 8-bit complementary code keying (CCK) algorithm for high data rate transmission.

The data transfer rate may also be improved above the symbol rate by employing higher order modulation techniques, including quadrature phase-shift keying (QPSK) modulation. According to such modulation techniques, each bit is represented by a higher number of possible phases. The transmitter therefore generates two signals, the first signal is called the "in-phase" (I) signal or "I channel" and the second signal is called the "quadrature" (Q) signal or "Q channel" for a 90 degree phase-shifted sinusoidal carrier at the same frequency.

The IEEE 802.11 standard for wireless LANs using direct sequence spread spectrum techniques employ a training preamble to train a receiver to a transmitter. Each transmitted data message comprises an initial training preamble followed by a data field. The preamble includes a synchronization field to ensure that the receiver can perform the necessary operations for synchronization. For the preamble length, two options have been defined, namely a long and a short preamble. All compliant 802.11b systems have to support the long preamble. The short preamble option is provided in the standard to improve the efficiency of the network throughput when transmitting special data such as voice or video. The synchronization field of a preamble consists of 128 one bits for a long preamble and 56 zero bits for a short preamble.

A receiver detects the synchronization symbols and aligns the receivers internal clock with the symbols in the synchronization field in order to establish a fixed reference time frame with which it interprets the fields in the transmission frame structure following the preamble. The preamble, including the synchronization field, is transmitted with the start of every message (data packet).

The purpose of a preamble detection unit is to continuously monitor the incoming signal for the preamble and to indicate if the preamble has been detected. The boundaries between consecutive Barker symbols or CCK symbols are determined and the forwarding of the symbols is to be synchronized to the receiver's processing schedule. Based on the preamble detection and a timing offset between a symbol arrival and a processing schedule of the following modules, the incoming signal is synchronized to the receivers processing schedule.

Referring now to FIG. 1, a detection process for detecting a preamble in a communication signal is illustrated. A preamble detection step 101 is performed after receiving a communication signal 100 and before subjecting the received communication signal to further processing, in particular to descrambling 102.

The configuration of a conventional preamble detector 200 is illustrated in FIG. 2. The received communication signal 201 consisting of an in-phase and a quadrature component is provided to preamble detector 200. In the preamble detector 200, the received communication signal 201 is first applied to a despreader 204, in particular a Barker matched filter (BMF). The despread communication signal is supplied to a demodulator (DEM) 205 for demodulating the despread communication signal. The demodulated signal consists of a sequence of "hard" decisions of the received bit sequence, i.e. each data value of the demodulated signal takes one of both possible binary values. The demodulated bit stream is monitored for detecting the predefined preamble data. Typically, a correlator (e.g. correlator 203) is used to detect the preamble. The correlator is essentially a matched filter for the preamble sequence. The correlator produces an output with a large magnitude when the preamble is present. Preamble detection is normally declared when the magnitude of the correlation exceeds a predefined threshold.

After preamble detection, the demodulated communication signal is applied to a (digital) descrambler (DDS) 206. An example of a prior art descrambler 300 (which may be simalar to DDS 206 of FIG. 2) is illustrated in FIG. 3. The incoming signal 301 a is supplied to delay blocks 304, 305 denoting a time delay of several units in accordance with a predefined descrambling rule. The delayed signals are fed back and combined using a multiplicator or exclusive-OR gate 306. The output is fed back to the incoming signal 301b and combined using a multiplier or exclusive-OR gate 303 to produce a descrambled output 302.

Synchronization data detecting units still have a number of problems. One problem is that noise may degrade the signal quality so that the synchronization unit, in particular the preamble detector, fails to declare a preamble even though a preamble is present in the received communication signal. Noise may also produce an output exceeding the threshold when an actual preamble is not present.

SUMMARY OF THE INVENTION

An improved synchronization detection unit and method are provided that enable a less error prone detection of predefined synchronization data.

In one embodiment, a synchronization data detection unit is provided in a communication system for detecting predetermined synchronization data of a transmission frame in a communication signal. The synchronization data include a sequence of identical binary symbols which are transmitted after being sent through a scrambler. The synchronization data detection unit comprises a descrambler for descrambling the received communication signal and for producing an output data sequence having multi-level signal values. The multi-level signal values are applied to a filter means for smoothing the descrambler output. The smoothed signal is supplied to a threshold means. The threshold means compares the smoothed output of the filter means with a predetermined threshold value. If the output of the filter means exceeds the predefined threshold value, the threshold means indicates the detection of said synchronization data.

In another embodiment, a synchronization data detection unit is provided in a communication system for detecting predetermined synchronization data of a transmission frame in a communication signal. The synchronization data include a sequence of identical binary symbols which are transmitted after being sent through a scrambler. The synchronization data detection unit comprises a descrambler for descrambling the received communication signal and for producing an output data sequence having multi-level signal values. The multi-level signal values are applied to a filter for smoothing the descrambler output. The smoothed signal is supplied to a comparator. The comparator compares the smoothed output of the filter with a predetermined threshold value. If the output of the filter exceeds the predefined threshold value, the comparator indicates the detection of said synchronization data.

In still another embodiment, a method for receiving synchronization data is provided for use in a communication system. The predetermined synchronization data are included in a transmission frame of a communication signal. The synchronization data comprise a sequence of identical binary symbols which are transmitted after scrambling. The received communication signal is descrambled to produce a sequence of multi-level output signal values. The multi-level output signal values are smoothed and the smoothed signal is compared to a predetermined threshold value. If the smoothed signal exceeds the predetermined threshold, said synchronization data are detected.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 1:
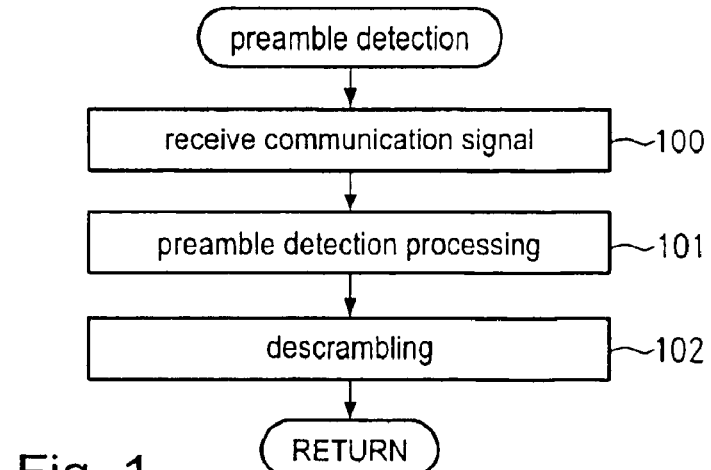
FIG. 1 is a flow-chart illustrating a preamble detection procedure.
Figure 2:
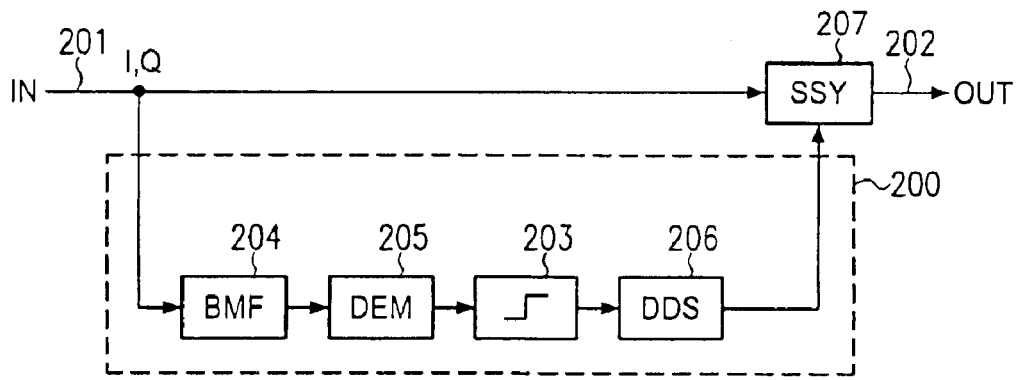
FIG. 2 is a block diagram illustrating a preamble detector for detecting a preamble in a communication signal.
Figure 3:
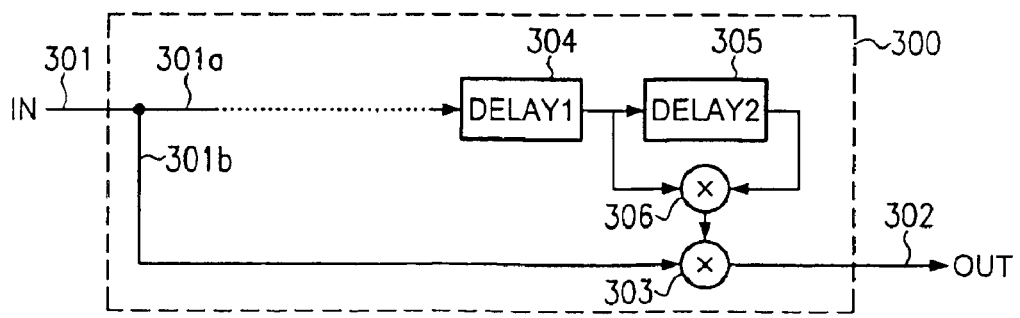
FIG. 3 is a block diagram illustrating the configuration of a descrambler incorporated into a preamble detector as shown in FIG. 2.
Figure 4:
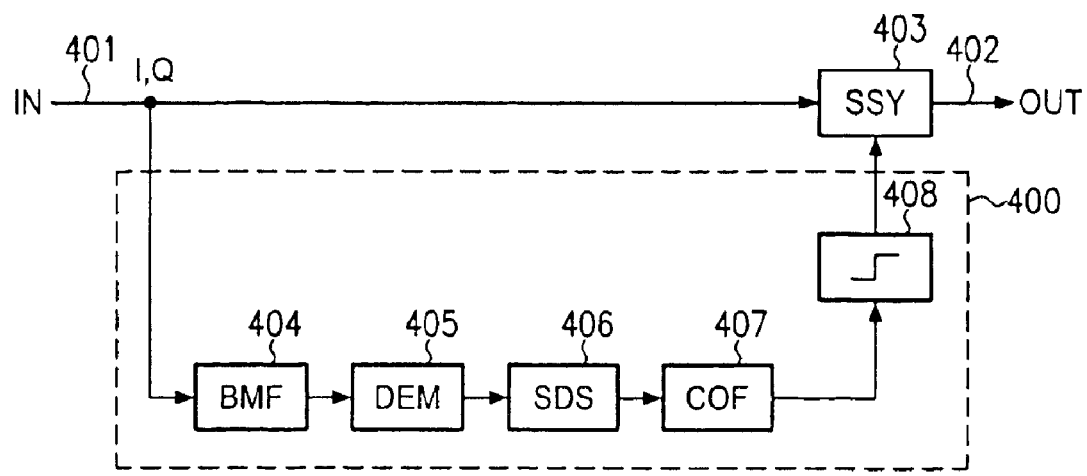
FIG. 4 is a block diagram illustrating a synchronization data detection unit.

Referring now to the drawings and in particular to FIG. 4, which illustrates a synchronization data detecting unit for detecting synchronization data, in particular a predefined preamble, as described herewith. The configuration as shown in FIG. 4 consists of a synchronization data detecting module 400 and a synchronizing module 403. The synchronization data detecting module 400 detects a preamble and may also provide a timing offset between a symbol arrival and the processing schedule of the following modules. The symbol synchronizer 403 will use the timing offset information to synchronize the data stream to the processing schedule.

The synchronization data detecting module 400 comprises the following modules: a Barker matched filter (BMF) module 404, a differential BPSK demodulator (DEM) module 405, and a soft descrambler (SDS) module 406. These modules, i.e. BMF, DEM, and SDS, form together a non-coherent receiver. Further, the synchronization data detecting module 400 comprises a comb filter (COF) module 407 for smoothing the descrambler output. For evaluating the smoothed data to detect the predefined preamble data the synchronization data detecting module 400 contains a threshold controller 408. Details of the above-identified modules are described below.

The Barker matched filter module 404 receives the communication signal 401 input to the synchronization data detecting module 400 and computes a correlation between the Barker sequence and the samples of the input signal. The Barker code word consists of eleven chips which comprise the sequence "01001000111" or "+1,−1,+1,+1,−1,+1,+1,+1,−1,−1,−1," (non-return-zero-NRZ), in which the leftmost chip is output first in time. One entire Barker code word sequence is received in the time period occupied by an information-containing symbol. Thus, if the symbol rate is 1 Mbaud, the underlying chip rate for the eleven chips of the Barker sequence is 11 MHz. By using the 11 MHz chip rate signal, the spectrum occupied by the transmitting signal is eleven times greater. In an exemplary implementation, the Barker sequence is extended from eleven samples to twenty-two samples due to an input sample rate of 22 Msps. This is achieved by stuffing zeros between the original elements of the Barker sequence.

The input samples of the I channel and the Q channel are correlated with the Barker sequence, respectively. A complex correlation sample is computed for each complex input sample. This may be implemented by a "sliding-window" algorithm known in the art.

The despread communication signal is applied to demodulator module 405. In a specific implementation, the demodulator module 405 is a differential BPSK demodulator.

Figure 5:
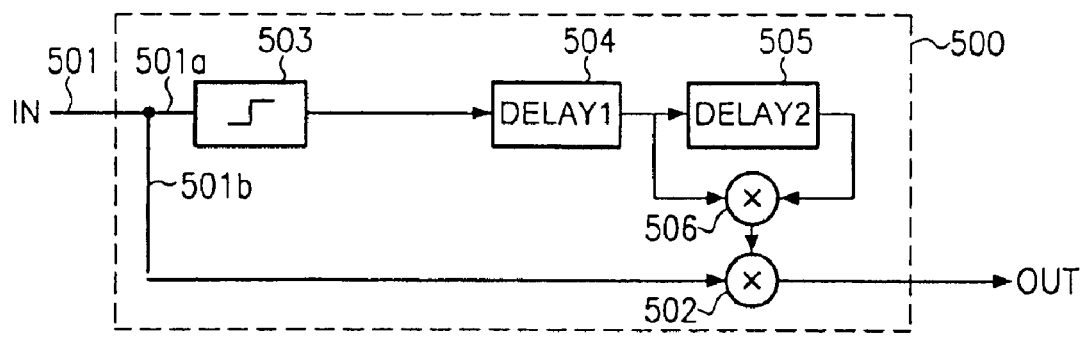
FIG. 5 is a block diagram illustrating a configuration of a half-soft descrambling module incorporated in the configuration as shown in FIG. 4.
Figure 6:
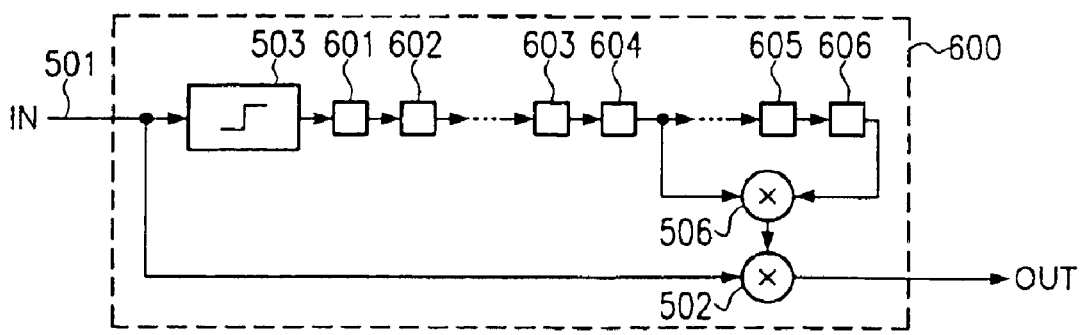
FIG. 6 is a block diagram illustrating a more detailed embodiment of the descrambling module shown in FIG. 5.

Turning now to FIG. 5 and FIG. 6, which illustrate particular implementations for a descrambler module 406. The descrambler module 406 may be implemented as a soft-descrambler outputting multi-value samples. In contrast to digital demodulators, in a soft descrambler multi-value input signals are not subjected to a "hard" binarization, but the descrambled output values are aligned around the expected binary values.

In other embodiments described herein, a "half-soft" descrambler is used for descrambling the demodulated signal. Examples of a configuration of a "half-soft" descrambler module 500 are shown in FIG. 5 and FIG. 6. A half-soft descrambler differs from a soft descrambler in that the input signal 501a applied to a "delay portion" 504–506 in said descrambler is binarized whereas the other branch of the input signal 501b is maintained as multi-value signal. In descrambler 500 of FIG. 5, the received input signal 501a is applied to a binarization portion 503 for converting a multi-value input sample value into a binary value.

The descrambler 500 is configured in accordance with a predefined generating polynomial, e.g. given by $1+x^a+x^b$ wherein $x^a$ and $x^b$ denote predefined time delays. The delayed signals are fed back and added to the input signal using a multiplication or exclusive-OR gate to produce the descrambled output. As shown in FIG. 6, the delay elements 504, 505 comprise a plurality of one bit registers 601–606, each denoting a time delay of one unit. The half-soft descrambler outputs a sequence of soft-symbols aligned around the expected binary values.

The half-soft descrambler arrangement of FIG. 5 and FIG. 6 may have the advantage that the hardware effort for providing multi-level output samples is considerably reduced compared to conventional soft descramblers.

When receiving preamble data, the multi-level output sample values of a soft or half-soft descrambler all have the same sign. In order to reduce an influence of random deviations in the output sample values, the output sample valules are averaged by means of a comb filter 407. Implementation examples for a comb filter are shown in FIG. 7 and FIG. 8.

Figure 7:
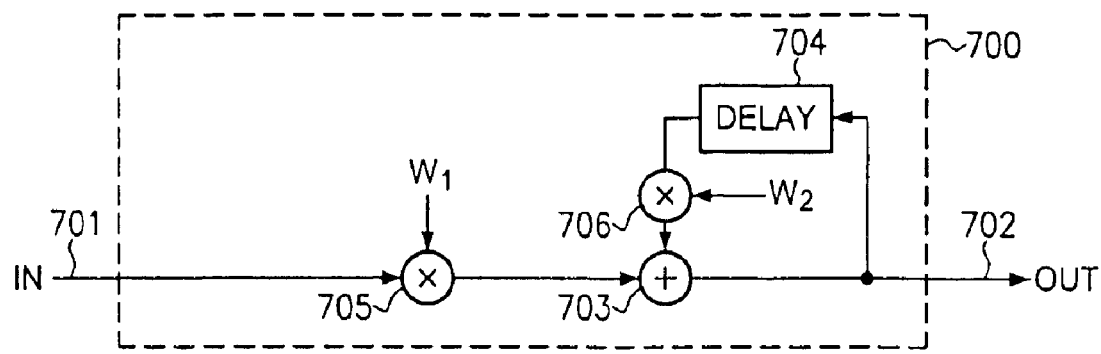
FIG. 7 is a block diagram illustrating a configuration of a filter module as shown in the configuration of FIG. 4.

Referring now to FIG. 7, the incoming real and imaginary data symbols 701 are applied to a multiplier 705 to be weighted with a weight $W_1$. The weighed signal is added to a fed back and delayed output signal 702 using a delay element 704 and an adder 703. Before adding the fed back output signal and the input signal, the delayed fed back signal is also weighted using a multiplier 706 with a weight $W_2$.

According to a particular embodiment, the incoming data symbols 701 are multiplied in multiplier 705 with a fixed-point equivalent of 0.2 and the delayed "averaged" values provided by delay element 704 are multiplied with a fixed-point equivalent of 0.8. Although the algorithm of this embodiment is described with reference to weighting values of 0.2 and 0.8, respectively, those skilled in the art will appreciate that the weighting algorithm may be implemented to the same effect using a variety of weighting value combinations $W_1$ and $W_2$. A noise reduction of the input sample values 701 may be increased by reducing the amount of weight $W_1$ and increasing the amount of weight $W_2$. In contrast, the accuracy of the received data symbols in time may be increased by increasing the amount of the first weight $W_1$ and decreasing the amount of the second weight $W_2$.

Figure 8:
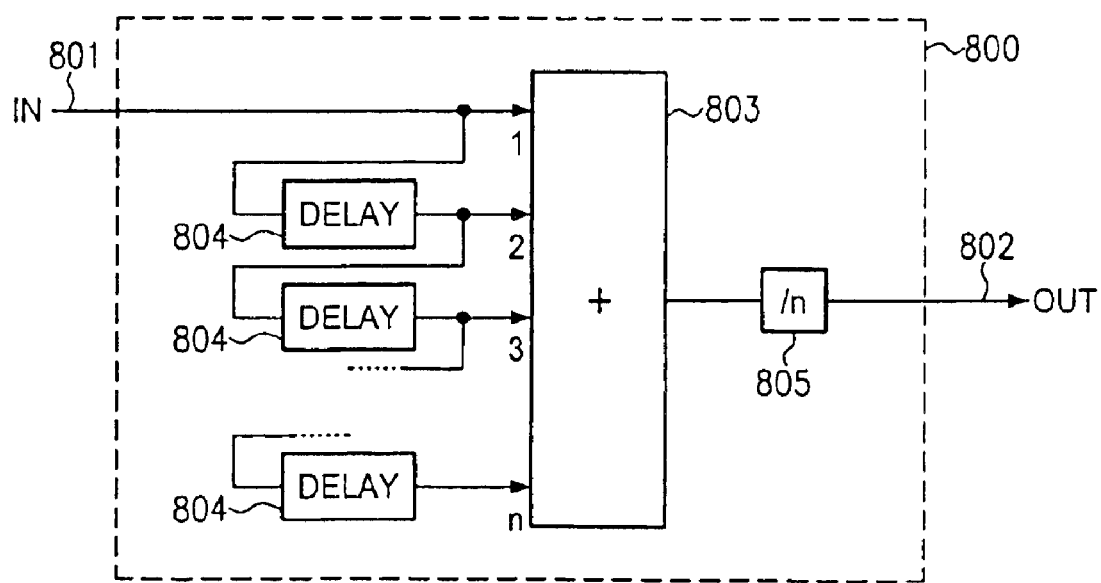
FIG. 8 is a block diagram illustrating another configuration of a filter module as shown in FIG. 6.

Another embodiment of a comb filter configuration is shown in FIG. 8. Each output of the depicted comb filter represents an average of n chip samples that are spaced by eleven or twenty-two samples (depending on the employed input sample rate). As those skilled in the art will appreciate, the number of averaged samples is set to be appropriate for a sufficient noise reduction. Noise will be reduced more efficiently when increasing the number n. In a specific example of this embodiment, the number n of averaged samples is 10. An averaged amplitude is computed separately for the in-phase channel I and the quadature channel Q. This may be achieved in the specific embodiment by implementing the following formulas:

$$f_I(k) = \frac{1}{10}\sum_{i=0}^{9} d_I(k-22i)$$

$$f_Q(k) = \frac{1}{10}\sum_{i=0}^{9} d_Q(k-22i)$$

wherein f(k) represents the comb filter output and d(k–22i) represents the descrambler output when employing a Barker sequence of 22 samples, as mentioned above.

Both filter outputs $f_I$ and $f_Q$ will be used to decide if a preamble is currently received. In a specific embodiment, both outputs are added to counter the influence of the frequency offset of the signal:

$$S(kT)=f_I(kT)+f_Q(kT)$$

wherein S represents the sum of both outputs and $f_I$ and $f_Q$ represent the averaged comb filter output of the respective channel.

Referring back to FIG. 8, comb filter 800 comprises a plurality of delay elements 804, an adder 803 and a divider 805. The incoming descrambler output 801 is applied to the adder 803 and branched to a first one of the identical delay elements 804. The output of each of the delay elements 804 is applied to adder 803 and to the input of a subsequent one of the delay elements 804. Adder 803 receives a predetermined number n of input signals which are accumulated and provided to divider 805. The number n of inputs and a corresponding number of n–1 of delay elements 804 is set in accordance with the above described considerations. Divider 805 normalizes the accumulated sum provided by adder 803.

Figure 9:
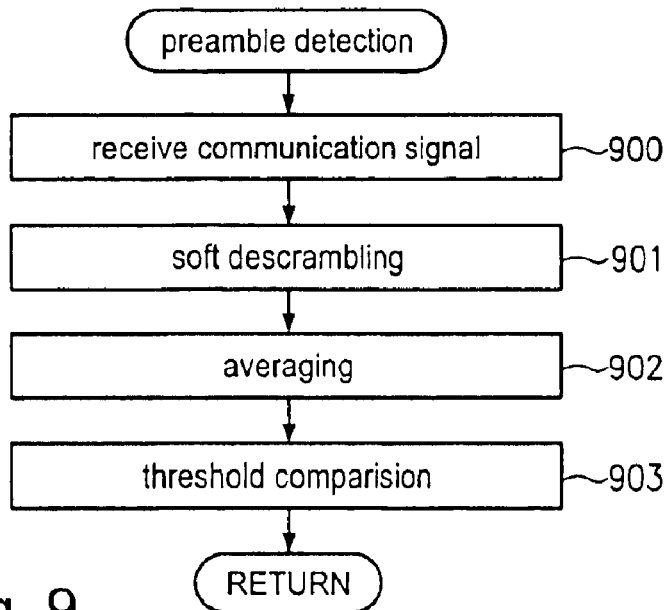
FIG. 9 is a flow-chart illustrating a preamble detection processing procedure.

FIG. 9 schematically shows an example of how to detect a preamble in an incoming communication signal. After receiving (step 900) the communication signal, the communication signal is subjected to a soft descrambling process 901 and the descrambled output is smoothed in order to reduce the influence of random deviations in the communication signal (902). The preamble is detected in the output signal on the basis of the output signal values of the averaged descrambler output in step 903. The preamble detection is performed by comparing the comb filter output against a predefined threshold value. Details of the process performed by threshold controller 408 are illustrated in FIG. 10.

Figure 10:
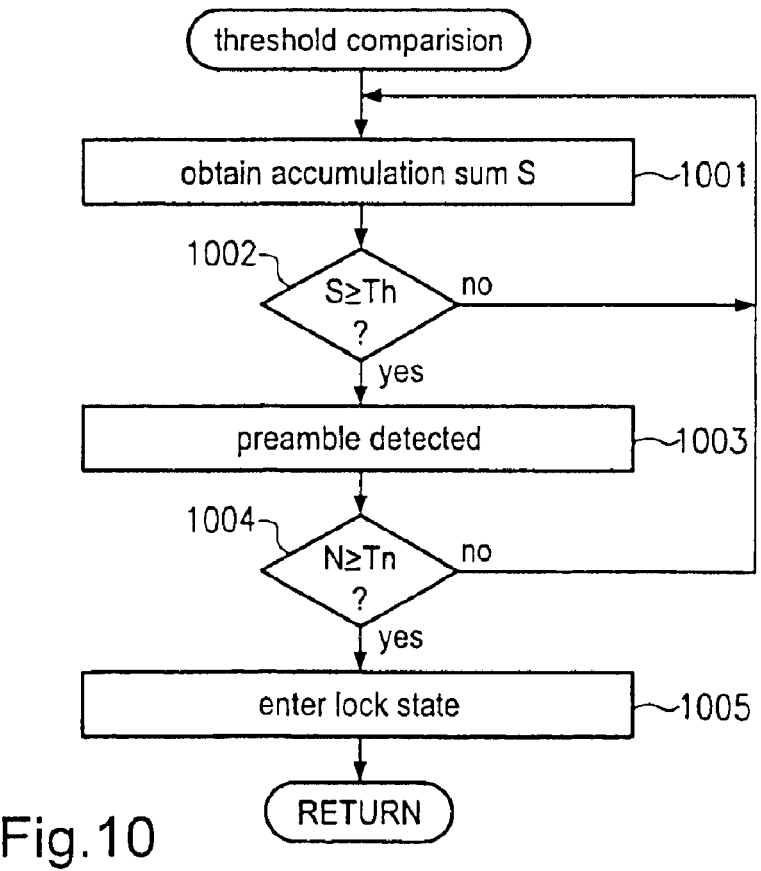
FIG. 10 is a flow-chart illustrating a threshold comparison procedure for detecting predetermined synchronization data in a communication signal.

As shown in FIG. 10, each obtained comb filter sum S (step 1001) is compared during preamble search against a predefined threshold Th in step 1002. When the comb filter output exceeds the predefined threshold Th, a preamble may have been detected (step 1003) and the preamble detection procedure enters a "preamble detecting state". Threshold controller 408 will remain in this state while fetching two more chips to determine if subsequent descrambler outputs are even larger.

After comparing these two further sample values, the threshold controller will periodically confirm the comparison result, i.e. to determine whether or not a descrambler peek re-appears after a symbol duration. The comb filter output has to exceed the predefined threshold Th a predetermined number of times before a preamble detection is definitely declared (steps 1004, 1005). The "locked state" (in case of a preamble detection) is entered after the comparator result in step 1002 is confirmed a predetermined number of times $T_N$. In one implementation, $T_N$ is 15, i.e. requiring to confirm a preamble detection 15 times. Those skilled in the art will appreciate that any other number of times may be implemented to the same effect, e.g. a number $T_N$ between 10 and 20 times.

In accordance with the IEEE 802.11b standard for wireless LANs, the threshold controller 408 may be adapted to detect a long and a short preamble. As both preambles not only differ by their lengths but also differ by the binary value of the preamble sequence, these preambles may be distinguished by employing different threshold values corresponding the binary preamble values.

Figure 11:
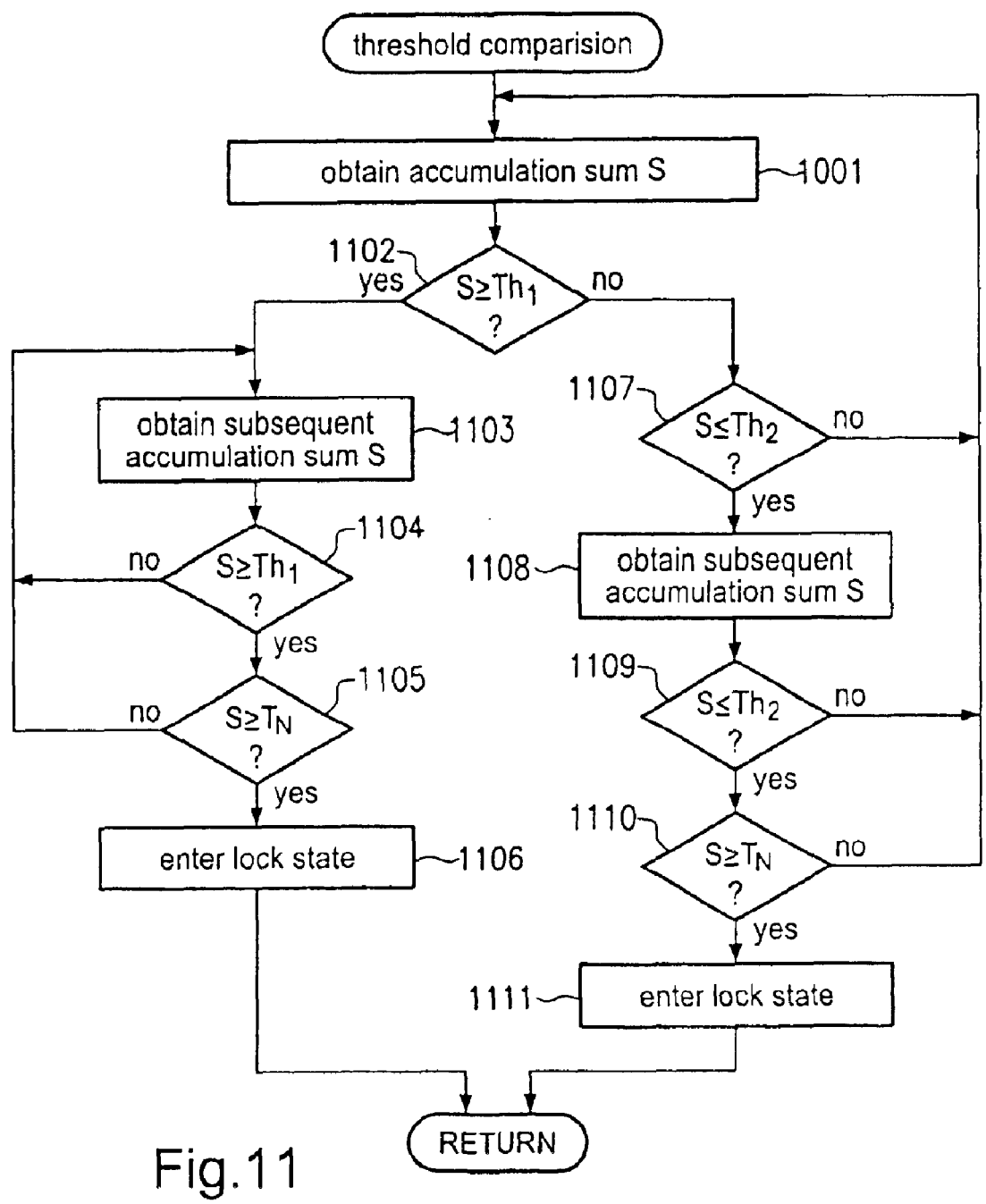
FIG. 11 is a flow-chart illustrating a more detailed threshold comparison procedure for detecting two different kinds of preambles in a communication signal.

A threshold comparison process able to detect a long and a short preamble in accordance with the wireless LAN standard is illustrated in FIG. 11. The preamble detection procedure employs a first threshold $Th_1$, and a second threshold $Th_2$. In accordance with the expected descrambler output values +1/−1 both threshold values only differ by the sign.

After having first detected a long or short preamble in step 1102 or in step 1107, a "reliability check" is performed for each of the preambles repeatedly either by steps 1103–1106 or by steps 1108–1111. In case the detected long or short preamble cannot be confirmed in one of the confirmation loops formed by steps 1103–1106 for a long preamble confirmation or by steps 1108–1111 for a short preamble confirmation, the threshold comparator returns to step 1101.

After a preamble has been detected and confirmed and a timing offset between symbol arrival and symbol processing in the following data modules is known, the symbol synchronizer module 403 will release the data such that symbol release and symbol processing are matched.

According to the various embodiments described above, the decision for each sent symbol is shifted from the demodulator's output to the comb filter's output. According to a specific embodiment, a half-soft descrambler is employed which introduces a binarization in the descrambler "delay path" comprising a plurality of one bit width registers. The output of the half-soft descrambler is a sequence of soft symbols which are aligned around the expected value of +1 (long preamble consisting of sent ones) or −1 (short preamble consisting of sent zeros) based on the sent preamble sequence.

The embodiments described above may provide a more reliable and improved preamble detection without increasing the hardware complexity. By shifting the preamble detecting step to a subsequent processing stage, the preamble detection of the various embodiments described herein reduce the occurrence of failure to detect a preamble or to wrongly detect a preamble.

What is claimed is:

1. A synchronization data detection unit in a communication system for detecting predetermined synchronization data of a transmission frame in a communication signal, said synchronization data including a sequence of identical binary symbols which are transmitted after scrambling, comprising:

a descrambler for descrambling the received communication signal and producing output data symbols having multi-level signal values, wherein the descrambler includes:

a binarization portion for converting a received multi-level input signal into a binary signal, a delay portion delaying the binary signal in accordance with a redefined descrambling rule, and a multiplication portion for multiplying the multi-level input signal with the binary signal output from the delay portion and outputting a descrambled signal;

a filter means for smoothing the descrambled output data symbols, and a threshold means for comparing the smoothed output of said filter means with a predetermined threshold value and indicating a detection of said synchronization data if the output of the filter means exceeds said predetermined threshold value.

2. The synchronization data detection unit according to claim 1, wherein said delay portion consists of a plurality of delay sections and at least one signal combining portion for combining binary signals having a different delay in accordance with a predefined descrambling rule.

3. The synchronization data detection unit according to claim 1, wherein the delay portion comprises a plurality of delay registers having a one bit width.

4. The synchronization data detection unit according to claim 1, wherein the descrambled signal output has at least a two bit width.

5. The synchronization data detection unit according to claim 1, wherein said filter means is a comb filter.

6. The synchronization data detection unit according to claim 5, wherein said comb filter comprises:

a predetermined number of identical delay portions for sequentially delaying a received input signal, and an accumulation means for accumulating the output signal of each of the delay portions and the input signal.

7. The synchronization data detection unit according to claim 6, wherein said comb filter further comprises normalizing means for dividing the accumulation result by the number of accumulated signals.

8. The synchronization data detection unit according to claim 6, wherein each of said delay portions consists of a predetermined number of registers in series connection.

9. The synchronization data detection unit according to claim 8, wherein said predetermined number of registers is larger than 5.

10. The synchronization data detection unit according to claim 6, wherein said comb filter comprises at least nine delay portions.

11. The synchronization data detection unit according to claim 1, wherein said threshold means being adapted to indicate a detection of said synchronization data after determining that a predetermined number of subsequent accumulation results exceeds said predetermined threshold.

12. The synchronization data detection unit according to claim 11, wherein said predefined number of subsequent accumulation results is a number between 5 and 20.

13. The synchronization data detection unit according to claim 12, wherein said predefined number of subsequent accumulation results is larger than 10.

14. The synchronization data detection unit according to claim 11, wherein said threshold means provides at least two threshold values to discriminate and detect synchronization data of different lengths in said communication signal.

15. The synchronization data detection unit according to claim 14, wherein said threshold means comprises a first threshold value for detecting synchronization data of a longer length and a second threshold value for detecting synchronization data of a shorter length.

16. The synchronization data detection unit according to claim 15, wherein said first and second threshold values have the same absolute value but different signs.

17. The synchronization data detection unit according to claim 1, wherein said communication system being adapted for employing a direct sequence spread spectrum transmission scheme for transmission of said communication signal and said synchronization data detection unit further comprises:
    a despreading unit for despreading the received communication signal, and
    a demodulating unit for demodulating the despread communication signal.

18. The synchronization data detection unit according to claim 1 wherein said communication system being a wireless local area network (WLAN) system.

19. A wireless LAN receiver comprising a synchronization data detection unit according to claim 1.

20. A synchronization data detection unit in a communication system for detecting predetermined synchronization data of a transmission frame in a communication signal, said synchronization data including a sequence of identical binary symbols which are transmitted after scrambling, comprising:
    a descrambler for descrambling the received communication signal and producing output data symbols having multi-level signal values, wherein the descrambler includes:
    a binarization portion for converting a received multi-level input signal into a binary signal,
    a delay portion delaying the binary signal in accordance with a predefined descrambling rule, and
    a multiplication portion for multiplying the multi-level input signal with the binary signal output from the delay portion and outputting a descrambled signal;
    a filter for smoothing the descrambled output data symbols, and
    a comparator for comparing the smoothed output of said filter with a predetermined threshold value and indicating a detection of said synchronization data if the output of said filter exceeds said predetermined threshold value.

21. The synchronization data detection unit according to claim 20, wherein the descrambled signal output has at least a two bit width.

22. The synchronization data detection unit according to claim 20, wherein said filter is a comb filter.

23. The synchronization data detection unit according to claim 20, wherein said comparator being adapted to indicate a detection of said synchronization data after determining that a predetermined number of subsequent accumulation results exceeds said predetermined threshold.

24. The synchronization data detection unit according to claim 20, wherein said communication system being adapted for employing a direct sequence spread spectrum transmission scheme for transmission of said communication signal and said synchronization data detection unit further comprises:
    a despreading unit for despreading the received communication signal, and
    a demodulating unit for demodulating the despread communication signal.

25. The synchronization data detection unit according to claim 20 wherein said communication system being a wireless local area network (WLAN) system.

26. A wireless LAN receiver comprising a synchronization data detection unit according to claim 20.

27. A method for detecting predetermined synchronization data of a transmission frame in a communication signal, said synchronization data including a sequence of identical binary symbols which are transmitted after scrambling, the method comprising the steps of:
    descrambling the received communication signal and producing an output data sequence having multi-level signal values, wherein said descrambling includes:
        converting the received multi-level input signal into a binary signal,
        delaying the binary signal in accordance with a predefined descrambling rule,
        multiplying the multi-level input signal with the binary signal, and
        outputting the descrambled signal;
    smoothing the multi-level signal values of the descrambled signal, and
    comparing the multi-level signal values of the smoothed signal with a predetermined threshold value and detecting said synchronization data if the smoothed signal exceeds the predetermined threshold value.

28. The method for detecting predetermined synchronization data according to claim 27, wherein the step of delaying the binary signal comprises the steps of delaying the binary signal and combining the delayed binary signal with a further delayed binary signal in accordance with the predetermined descrambling rule.

29. The method for detecting predetermined synchronization data according to claim 27, wherein said smoothing step averages the signal values of the received descrambled signal.

30. The method for detecting predetermined synchronization data according to claim 29, wherein said averaging step comprises the steps of:
    subsequently delaying the received input signal a plurality of times,
    accumulating each of the delayed signal portions and the input signal, and
    outputting the accumulated signal.

31. The method for detecting predetermined synchronization data according to claim 30, wherein said output signal being normalized by dividing the accumulated signal by the number of accumulated signal portions.

32. The method for detecting predetermined synchronization data according to claim 27, wherein said comparing step further comprises the step of indicating a detection of said synchronization data after determining that said accumulation result subsequently exceeds said predetermined threshold a predetermined number of times.

33. The method for detecting predetermined synchronization data according to claim 32, wherein said comparing step comprises the step of:
  comparing the accumulation result with a first threshold value for detecting synchronization data of a longer length, and
  comparing said accumulation result with a second threshold value for detecting synchronization data of a shorter length.

34. The method for detecting predetermined synchronization data according to claim 33, wherein said first and said second threshold values have the same absolute value but different signs.

35. The method for detecting predetermined synchronization data according to claim 27, wherein said communication signal being transmitted using a direct sequence spread spectrum transmission scheme and said communication signal being despread and demodulated before being descrambled.

36. A synchronization data detection unit in a communication system for detecting predetermined synchronization data of a transmission frame in a communication signal, said synchronization data including a sequence of identical binary symbols which are transmitted after scrambling, comprising:
  a descrambler for descrambling the received communication signal and producing output data symbols having multi-level signal values,
  a filter means for smoothing the descrambled output data symbols, wherein said filter means is a comb filter, and
  a threshold means for comparing the smoothed output of said filter means with a predetermined threshold value and indicating a detection of said synchronization data if the output of the filter means exceeds said predetermined threshold value.

37. A synchronization data detection unit in a communication system for detecting predetermined synchronization data of a transmission frame in a communication signal, said synchronization data including a sequence of identical binary symbols which are transmitted after scrambling, comprising:
  a descrambler for descrambling the received communication signal and producing output data symbols having multi-level signal values,
  a filter means for smoothing the descrambled output data symbols, and
  a threshold means for comparing the smoothed output of said filter means with a predetermined threshold value and indicating a detection of said synchronization data if the output of the filter means exceeds said predetermined threshold value, wherein said threshold means being adapted to indicate a detection of said synchronization data after determining that a predetermined number of subsequent accumulation results exceeds said predetermined threshold.

38. A synchronization data detection unit in a communication system for detecting predetermined synchronization data of a transmission frame in a communication signal, said synchronization data including a sequence of identical binary symbols which are transmitted after scrambling, comprising:
  a descrambler for descrambling the received communication signal and producing output data symbols having multi-level signal values,
  a filter for smoothing the descrambled output data symbols, wherein said filter is a comb filter, and
  a comparator for comparing the smoothed output of said filter means with a predetermined threshold value and indicating a detection of said synchronization data if the output of said filter exceeds said predetermined threshold value.

39. A synchronization data detection unit in a communication system for detecting predetermined synchronization data of a transmission frame in a communication signal, said synchronization data including a sequence of identical binary symbols which are transmitted after scrambling, comprising:
  a descrambler for descrambling the received communication signal and producing output data symbols having multi-level signal values,
  a filter for smoothing the descrambled output data symbols, and
  a comparator for comparing the smoothed output of said filter means with a predetermined threshold value and indicating a detection of said synchronization data if the output of said filter exceeds said predetermined threshold value, and wherein said comparator being adapted to indicate a detection of said synchronization data after determining that a predetermined number of subsequent accumulation results exceeds said predetermined threshold.

40. A method for detecting predetermined synchronization data of a transmission frame in a communication signal, said synchronization data including a sequence of identical binary symbols which are transmitted after scrambling, the method comprising the steps of:
  descrambling the received communication signal and producing an output data sequence having multi-level signal values,
  smoothing the multi-level signal values of the descrambled signal, wherein said smoothing step averages the signal values of the received descrambled signal, and
  comparing the multi-level signal values of the smoothed signal with a predetermined threshold value and detecting said synchronization data if the smoothed signal exceeds the predetermined threshold value.

41. A method for detecting predetermined synchronization data of a transmission frame in a communication signal, said synchronization data, including a sequence of identical binary symbols which are transmitted after scrambling, the method comprising the steps of:
  descrambling the received communication signal and producing an output data sequence having multi-level signal values,
  smoothing the multi-level signal values of the descrambled signal, and
  comparing the multi-level signal values of the smoothed signal with a predetermined threshold value and detecting said synchronization data if the smoothed signal exceeds the predetermined threshold value, and wherein said comparing further comprises indicating a detection of said synchronization data after determining that said accumulation result subsequently exceeds said predetermined threshold a predetermined number of times.

42. A method for detecting predetermined synchronization data of a transmission frame in a communication signal, said synchronization data including a sequence of identical binary symbols which are transmitted after scrambling, the method comprising the steps of:
  descrambling the received communication signal and producing an output data sequence having multi-level signal values, smoothing the multi-level signal values of the descrambled signal, and comparing the multi-level signal values of the smoothed signal with a predetermined threshold value and detecting said synchronization data if the smoothed signal exceeds the predetermined threshold value;

wherein said communication signal is transmitted using a direct sequence spread spectrum transmission scheme and said communication signal being despread and demodulated before being descrambled.

* * * * *